(12) United States Patent
Ye et al.

(10) Patent No.: US 12,457,926 B1
(45) Date of Patent: Nov. 4, 2025

(54) LAWNMOWER WITH MAINTENANCE COUPLING

(71) Applicant: Delangfu Technology (Dongguan) Co., Ltd., Guangdong (CN)

(72) Inventors: Guixing Ye, Guangdong (CN); Zhiguang Liu, Guangdong (CN)

(73) Assignee: Delangfu Technology (Dongguan) Co., Ltd., Guangdong (CN)

( * ) Notice: Subject to any disclaimer, the term of this patent is extended or adjusted under 35 U.S.C. 154(b) by 0 days.

(21) Appl. No.: 19/190,902

(22) Filed: Apr. 28, 2025

Related U.S. Application Data

(63) Continuation of application No. PCT/CN2025/076443, filed on Feb. 8, 2025.

(51) Int. Cl.
| | | |
|---|---|---|
| *A01D 34/46* | (2006.01) | |
| *A01D 67/00* | (2006.01) | |
| *A01D 101/00* | (2006.01) | |

(52) U.S. Cl.
CPC ........... *A01D 34/46* (2013.01); *A01D 67/005* (2013.01); *A01D 2101/00* (2013.01)

(58) Field of Classification Search
CPC ....... A01D 34/46; A01D 34/47; A01D 67/005
See application file for complete search history.

(56) References Cited

U.S. PATENT DOCUMENTS

| | | | | |
|---|---|---|---|---|
| 1,886,408 A | * | 11/1932 | Locke .................... | A01D 34/46 56/250 |
| 2,505,879 A | * | 5/1950 | Blydenburgh ......... | A01D 34/42 56/15.8 |
| 6,098,388 A | * | 8/2000 | Davies ................... | A01D 34/62 56/DIG. 14 |
| 6,622,464 B2 | * | 9/2003 | Goman ................... | A01D 34/62 56/11.4 |
| 7,111,443 B2 | * | 9/2006 | Anderson .............. | A01D 34/47 56/10.8 |

(Continued)

FOREIGN PATENT DOCUMENTS

| | | |
|---|---|---|
| CN | 206525153 U | 9/2017 |
| CN | 107900600 A | 4/2018 |

(Continued)

OTHER PUBLICATIONS

International Search Report received in corresponding International Patent Application No. PCT/CN2025/076443, mailed Mar. 24, 2025, 16 pages.

(Continued)

*Primary Examiner* — Alicia Torres
(74) *Attorney, Agent, or Firm* — Cooper Legal Group, LLC

(57) ABSTRACT

A lawnmower includes a power unit and a lawn mowing device, the power unit includes a base, the lawn mowing device includes a blade holder detachably connected to the base, the base is provided with a first locking device for fixing the blade holder, the first locking device includes a first installation rod on the base, first pins and first locking mechanisms disposed on the first installation rod for fixing the first pins, each end of the first installation rod is configured with a first insertion hole, the blade holder is configured with penetrating holes, and each of the first pins penetrates through a respective one of the penetrating holes and the first insertion hole sequentially.

15 Claims, 11 Drawing Sheets

(56) References Cited

U.S. PATENT DOCUMENTS

| | | | | |
|---|---|---|---|---|
| 7,448,193 B2* | 11/2008 | Derby | .................... | A01D 34/47 |
| | | | | 56/294 |
| 7,669,397 B1* | 3/2010 | Goman | .................. | A01D 34/62 |
| | | | | 56/12.6 |
| 8,161,720 B1* | 4/2012 | Humphrey | .............. | A01D 42/00 |
| | | | | 172/21 |
| 8,844,252 B2* | 9/2014 | Pilon, Jr. | ................. | A01D 43/00 |
| | | | | 56/249.5 |
| 9,027,318 B2* | 5/2015 | Akahane | ................ | A01D 34/54 |
| | | | | 56/249 |
| 11,212,960 B2* | 1/2022 | Georgoulias | ......... | A01D 75/303 |

FOREIGN PATENT DOCUMENTS

| | | | |
|---|---|---|---|
| CN | 217336468 U | 9/2022 | |
| CN | 218851330 U | 4/2023 | |
| CN | 218851331 U | 4/2023 | |
| CN | 221058826 U | 6/2024 | |
| CN | 222283990 U | 1/2025 | |
| CN | 222639127 U | 3/2025 | |
| GB | 2374789 A | 10/2002 | |
| KR | 20180058586 A | 6/2018 | |
| WO | 2024178676 A1 | 9/2024 | |

OTHER PUBLICATIONS

Office Action received in corresponding Chinese patent application No. 202510143327.2, dated Aug. 29, 2025, 18 pages.

* cited by examiner

A-A

A

LAWNMOWER WITH MAINTENANCE COUPLING

CROSS-REFERENCE TO RELATED APPLICATIONS

The present application is a continuation of PCT application serial no. PCT/CN2025/076443, filed on Feb. 8, 2025. The entirety of PCT application serial no. PCT/CN2025/076443 is hereby incorporated by reference herein and made a part of this specification.

FIELD OF THE PRESENT APPLICATION

The present application relates to a lawn mowing device, and in particular, to a lawnmower.

BACKGROUND OF THE PRESENT APPLICATION

As a core tool for garden maintenance, a lawnmower plays a role in lawn mowing, gardening landscape maintenance and the like. However, with evolution of science and technology and increasing demand on performance of the lawnmower, the performance of the lawnmower is continuously enhancing, so as to make breakthrough in simplicity in operation, efficiency in lawn mowing and safety in usage.

Various apparatuses, mechanisms or parts in a lawnmower in the related art are secured by pins mostly. When a certain apparatus, mechanism or part needs to be disassembled independently, a tool has to be used for disassembly each time, which increases time cost of finding the tool, and brings additional operation steps. Additionally, the process of assembly or disassembly is relatively tedious and time-consuming since these apparatuses, mechanisms or parts are usually fixed by a large number of pins. The assembly or disassembly process takes at least five minutes each time, and even more than 30 minutes for the lawnmower with a complex structure, which reduces maintenance efficiency of the lawnmower.

SUMMARY

The present application provides a lawnmower having improved maintenance efficiency and convenience.

A lawnmower includes a power unit and a lawn mowing device, the power unit includes a base, the lawn mowing device includes a blade holder detachably connected to the base, the base is provided with a first locking device for fixing the blade holder, the first locking device includes a first installation rod on the base, first pins and first locking mechanisms disposed on the first installation rod for fixing the first pins, each end of the first installation rod is configured with a first insertion hole, the blade holder is configured with penetrating holes, and each of the first pins penetrates through a respective one of the penetrating holes and the first insertion hole sequentially.

According to the above technical solution, the first pin penetrates through the penetrating hole on the blade holder and the first insertion hole on the first installation rod, and then is secured by the first locking mechanism, so that rapid disassembly and assembly of the blade holder and the base are realized, thereby realizing rapid assembly and disassembly of the lawn mowing device and the power unit. In the present application, the first pins are used for replacing traditional bolts for fixation, so that the cutting device may be manually disassembled without tools such as a wrench, which improves the maintenance efficiency of the lawnmower.

Optionally, each of the first locking mechanisms includes a first locking rod and a first elastic member, the first installation rod is configured with first sliding-fit holes, an axial direction of the first sliding-fit holes is perpendicular to an axial direction of the first insertion hole, the first locking rod is inserted into and in sliding fit with a respective one of the first sliding-fit holes, the first elastic member is sleeved on the first locking rod and disposed in the respective one of the first sliding-fit holes, the first elastic member has a first end fixedly connected to the first locking rod and a second end fixedly connected to an inner side wall of the respective one of the first sliding-fit holes, and when no external force is applied to the first elastic member, an end of the first locking rod abuts against an outer side wall of a respective one of the first pins by an elastic force of the first elastic member.

According to the above technical solution, the first locking rod slides in the first sliding-fit hole, so as to effectively secure and release the first pins in cooperation with the elastic force of the first elastic member. After the first pins are inserted in place, the first locking rod clamps the first pin under the first elastic member to prevent the first pin from falling off, thereby stably connecting the blade holder and the base. When the connection between the blade holder and the base needs to be released, the user only needs to overcome the elastic force of the first elastic member to move the first locking rod to release the first pin, which usually may be completed within 0-5 seconds.

Optionally, the outer side wall of each of the first pins is configured with a first positioning groove, and when no external force is applied to a respective one of the first pins, the end of the first locking rod is driven to abut against a groove bottom of the first positioning groove by the elastic force of the first elastic member.

According to the above technical solution, the first positioning groove on the first pin is matched with the end of the first locking rod, and the end of the first locking rod may stably abut against the groove bottom of the first positioning groove under the elastic force of the first elastic member, so as to lock the first pin firmly, which enhances the connection stability, prevents the first pin from accidentally falling off under vibration or an external force, so as to ensure the reliable connection between the blade holder and the base, thereby improving safety and durability of the lawnmower.

Optionally, a first connection device is provided between the base and the first locking device, the first locking device oscillates laterally through the first connection device, the first connection device includes at least two connection rods, and a first end of each of the at least two connection rods is rotatably connected to the base while a second end of each of the at least two connection rods is rotatably connected to the first installation rod.

According to the above technical solution, when the lawnmower moves forward, the blade holder may be finely adjusted within the limited rotation angle described above when a height difference or a slope exists in a lateral direction of the ground, so that the lawn mowing device may better adapt to diversified lawn mowing requirements, and high working efficiency and operation convenience can be maintained regardless of ascending or descending slope. The first connection device is implemented through at least two connection rods, such that the first locking device may oscillate to a certain degree relative to the base when a height difference or a slope exists in the lateral direction in the advancing process of the lawnmower, so as to maintain a stable contact between the lawn mowing device and the ground, and reduce the influence of terrain change on the operation stability of the lawnmower.

Optionally, a second connection device is provided between the first locking device and the blade holder, and the blade holder oscillates front-to-back through the second connection device.

According to the above technical solution, the blade holder can be finely adjusted in a limited rotation angle range when the slope changes, so that the lawn mowing device can better adapt to diversified lawn mowing requirements, so as to maintain the high efficiency and convenience of the operation regardless of ascending or descending slope.

Optionally, the second connection device includes two connection blocks, the blade holder includes a top blade carrier rotatably connected to the two connection blocks, the penetrating holes are formed on the two connection blocks, the first installation rod is configured with two assembly grooves for positioning the two connection blocks, each of the two assembly grooves is open on one side, when the two connection blocks are mounted in the two assembly grooves respectively, a side wall of each of the two connection blocks abuts against an inner side wall of a respective one of the two assembly grooves, and an axis of the first insertion hole coincides with an axis of each of the penetrating holes.

According to the above technical solution, the assembly is open on one side, so as to realize a quick alignment and insertion of the connection block. When the connection block is completely assembled in the assembling groove, the side wall of the connection block tightly abuts against the inner side wall of the assembly groove, to ensure a stable connection between the blade holder and the base. Meanwhile, the first pin penetrates through the penetrating hole and the first insertion hole and is firmly locked by the first elastic locking mechanism, so that stability and safety of the connection are enhanced. The assembly and disassembly process of the lawn mowing device is simplified, and the maintenance efficiency is improved.

Optionally, the blade holder is provided with a limiting mechanism including two limiting members on the blade holder, the two limiting members are respectively located on two sides of each of the two connection blocks, and when the blade holder rotates, a side wall of the blade holder contacts an inner side wall of a respective one of the two limiting members, so as to limit a rotation angel of the blade holder by the two limiting members.

According to the above technical solution, the connection block is stably secured on the first installation rod through the first locking mechanism. The two limiting members on the blade holder are located on two sides of the connection block respectively, so as to limit the rotation angle of the blade holder relative to the first installation rod within the range of 0 to 30 degrees by the two limiting members, which ensures the stability of the lawn mowing device during operation, and avoids the operation runaway or damage caused by excessive rotation. The blade holder can be finely adjusted in the limited rotation angle when the slope changes, so that the lawn mowing device can better adapt to diversified lawn mowing requirements, thereby maintaining high efficiency and convenience of the operation regardless of ascending or descending slope.

Optionally, the top blade carrier includes a connection member and at least one end plate, an end of the connection member is detachably connected to a respective one of the at least one end plate, one side of each of the at least one end plate is configured with a relief groove, and the relief groove is open toward an edge of a respective one of the at least one end plate.

Since an end plate in the related art is designed with a through hole (circular, square, or elliptical), in the disassembly process of the end plate, parts outside the end plate must be disassembled firstly. Each of the assembly or disassembly process generally requires more than 30 minutes or more than 1 hours. In contrast, one side of the penetrating hole on the end plate in the present application is open, such that the parts outside the end plate must not be disassembled during assembly or disassembly of the end plate. That is, only the end plate needs to be disassembled, and no other parts need to be disassembled. Therefore, it generally requires only about 5 minutes, thereby improving the maintenance efficiency.

Optionally, the lawn mowing device further includes a first lawn mowing mechanism, and the first lawn mowing mechanism includes a lawn mowing motor detachably connected to the blade holder and a reel blade rotatably disposed on the blade holder.

According to the above technical solution, the first lawn mowing mechanism is configured, so that the lawn mowing motor may be detachably connected to the blade holder, the output shaft thereof may be directly and fixedly connected to the reel blade, to drive the reel blade to rotate for lawn mowing, which is convenient for maintain and replacing the lawn mowing motor, ensures that the reel blade can obtain stable and powerful power, to effectively improve the efficiency and quality of the lawn mowing.

Optionally, the blade holder is provided with a rotary locking device including a linkage member and at least one rotary locking member, the linkage member is connected with the at least one rotary locking member, each of the at least one rotary locking member is configured with an arc-shaped locking groove, the lawn mowing motor is provided with at least one locking post, when the at least one rotary locking member rotates, each of the at least one locking post lie in a movement track of the arc-shaped locking groove on a respective one of the at least one rotary locking member, and when the at least one rotary locking member rotates to a position, each of the at least one locking post falls into a respective one of the at least one arc-shaped locking groove, so as to secure the lawn mowing motor on the blade holder.

According to the above technical solution, the rotary locking device on the blade holder is matched with the locking post on the lawn mowing motor through the arc-shaped locking groove in at least one rotary locking member. The locking groove passes the locking post through the rotary locking member, and the locking post falls into the locking groove in a proper position, so as to rapidly secure the lawn mowing motor. Additionally, due to the non-standard arc-shaped locking groove, the rotary locking member does not easily rotate after the lawn mowing motor is locked no matter whether the locking post is secured or rotatable on the lawn mowing, so that the lawn mowing motor may be secured by the rotary locking member more firmly. This design not only simplifies the assembly process of the lawn mowing motor but also provides a secure connection, ensuring operational stability and safety during high-speed rotation while facilitating convenient disassembly and maintenance of the lawn mowing motor.

Optionally, the base is provided with a battery assembly connected to the lawn mowing motor through a cable, a flexible jacket is sleeved on the cable, a hard jacket is sleeved on the flexible jacket, the hard jacket is detachably connected to the lawn mowing motor, the hard jacket includes two clamping sleeves, inner side walls of the two clamping sleeves abut against each other, the two clamping sleeves are secured through bolts and nuts, the lawn mowing motor is provided with a bearing part, each of the two clamping sleeves is fixedly provided with mounting parts, lower surfaces of the mounting parts abut against an upper surface of the bearing part, upper surfaces of two of the mounting parts on a same side each are provided with a clamping block, a lower surface of the clamping block abuts against the upper surfaces of the two of the mounting parts simultaneously, the clamping block is penetrated through a bolt in correspondence with a respective one of the mounting parts, and the bolt penetrates through and is in threaded connection with the respective one of the mounting parts.

The gasoline engine is used for driving the reel blade to rotate in the related art, the environment is easily polluted. However, in the present application, the battery assembly is connected to the lawn mowing motor through the cable, the hard jacket includes two detachable clamping sleeves, is fixed to the bearing part on the lawn mowing motor through bolts and nuts, and is assembled firmly by means of the clamping blocks, such that the cable is protected from being damaged, prevented from being bent and deformed, and such that the assembly and maintenance are facilitated, which ensures the stability and safety of power transmission, and improves the environmental protection of the whole equipment.

Optionally, the lawn mowing device further includes a second lawn mowing mechanism detachably connected to the blade holder and below the first lawn mowing mechanism, the second lawn mowing mechanism includes a bottom blade carrier detachably connected to the blade holder and a bottom blade disposed on the bottom blade carrier, the bottom blade is located below the reel blade, an upper surface of the bottom blade extends obliquely, a bottom of the reel blade abuts against the upper surface of the bottom blade, the upper surface of the bottom blade is configured with a strip-shaped sharpening channel, and an inner side wall on one side of the strip-shaped sharpening channel is provided with a sharpening ridge.

According to the above technical solution, when the lawn mowing motor drives the reel blade to rotate in the forward direction (the lawn mowing direction), the sharp edge of the reel blade is in contact with the upper surface of the bottom blade, and the both cooperate to realize the lawn mowing. At this time, the interaction between the reel blade and the bottom blade is mainly concentrated on the transmission of the mowing force, and the design of the inclined upper surface of the bottom blade helps guide grass leaves to smoothly enter the mowing area while reducing the mowing resistance. However, when the lawn mowing motor drives the reek blade to rotate in the reverse direction (the blade sharpening direction), the bottom edge of the reel blade is periodically in contact with the sharpening ridge, so s to remove the passivation layer accumulated on the edge of the reel blade due to long-term use gradually, and recover the sharpness thereof. The bottom blade carrier is detachably connected to the blade holder, and the bottom blade is arranged on the bottom blade carrier, so that replacement and maintenance of the bottom blade and the bottom blade carrier are facilitated.

Optionally, the blade holder is further provided with a second locking device for fixing the bottom blade carrier, the second locking device includes a second installation rod, second pins and second locking mechanisms, the second installation rod is secured on the base and have two ends abutting against inner side walls of the two connection blocks respectively, each of the two ends of the second installation rod is configured with a second insertion hole, each of the second pins penetrates through the insertion hole and the second insertion hole sequentially, so as to fix the blade holder on the base, each of the second locking mechanism includes a second locking rod and a second elastic member, the second installation rod is configured with second sliding-fit holes, an axial direction of each of the second sliding-fit holes is perpendicular to an axial direction of the second insertion hole, the second locking rod is inserted into and in sliding fit with a respective one of the second sliding-fit holes, the second elastic member is sleeved on the second locking rod and is disposed in the respective one of the second sliding-fit holes, the second elastic member has a first end fixedly connected to the second locking rod and a second end fixedly connected to the second installation rod, and when no external force is applied to the second elastic member, the second locking rod abuts against a surface of a respective one of the second pins by an elastic force of the second elastic member.

According to the above technical solution, a quick and stable connection between the bottom blade carrier and the blade holder is achieved by utilizing the second installation rod, the second pins and the second locking mechanisms. The effective securing and releasing of the second pin are realized due to the sliding fit of the second locking rod in the first sliding-fit hole and the elastic force of the second elastic member. After the second pin is inserted in place, the second locking rod clamps the second pin under the push of the second elastic member, to stably connect the bottom blade carrier and the blade holder. When the blade holder needs to be disassembled, the second pin can be released by moving the second locking rod only by overcoming the elastic force of the second elastic member, so as to realize a quick disassembly. The disassembly process of the bottom blade carrier is simplified, the connection stability and the disassembly convenience are improved, and the maintenance efficiency and the operation convenience of the lawnmower are improved.

Optionally, the lawnmower further includes a control device including a handrail detachably connected to the base, a control unit disposed on the handrail and configured to receive an operation instruction and control operation of the power unit and the lawn mowing device of the lawnmower, and a control rod, the control rod is rotatably connected to the handrail.

According to the above technical solution, the handrail is detachably connected to the base of the lawnmower, the control unit is disposed on the handrail to receive the operation instruction, and the control rod is equipped with the two ends thereof rotationally connected to the control unit and the handrail respectively, so that only when an operator holds the handrail and presses the control rod at the same time, the control unit can receive the starting signal, so as to control the operation of the power unit and the lawn mowing device, which improves the operation safety. The flexible operation, terrain adaptability and stability of the lawnmower are achieved through adjustability of the height of the handrail and structural reinforcement of the reinforcing rod, so that the lawn mowing efficiency and the operation experience are effectively improved.

Optionally, the power unit further includes a wheel mechanism rotatably connected to the base and a drive mechanism configured to drive the wheel mechanism to rotate, the drive mechanism includes a traction motor, the control device further includes a balance meter electrically connected to the traction motor, when the lawnmower is inclined at an angle greater than 10° during an advancing or turning process of the lawnmower, the balance meter senses an inclined state of the lawnmower in real time, and transmits a signal to the traction motor, so as to regulate and slow down a forward speed of the lawnmower automatically, and when a rotation speed of an output shaft of the traction motor increases or decreases, a rotation speed of an output shaft of the lawn mowing motor correspondingly increases or decreases, so as to ensure that a mowing speed of the lawn mowing device is synchronized with the forward speed of the lawnmower.

According to the above technical solution, in the advancing or turning process of the lawnmower, when an operator presses the handrail while pressing the control rod, the handrail drives the base to rotate, in the case that the base inclined at an angle exceeding 10 degrees, the balance meter can quickly sense and transmit a signal to the traction motor, to regulate and control the forward speed of the lawnmower automatically, which effectively improve the stability and safety of the lawnmower. When the rotation speed of the output shaft of the traction motor changes, the rotation speed of the output shaft of the lawn mowing motor can respond in real time and can be adjusted correspondingly, so as to ensure that the mowing speed of the lawn mowing device is always synchronized with the forward speed of the lawnmower as a whole.

DETAILED DESCRIPTION

The present application will be described in detail as below with reference to FIGS. 1-11.

Embodiment 1

Figure 1:
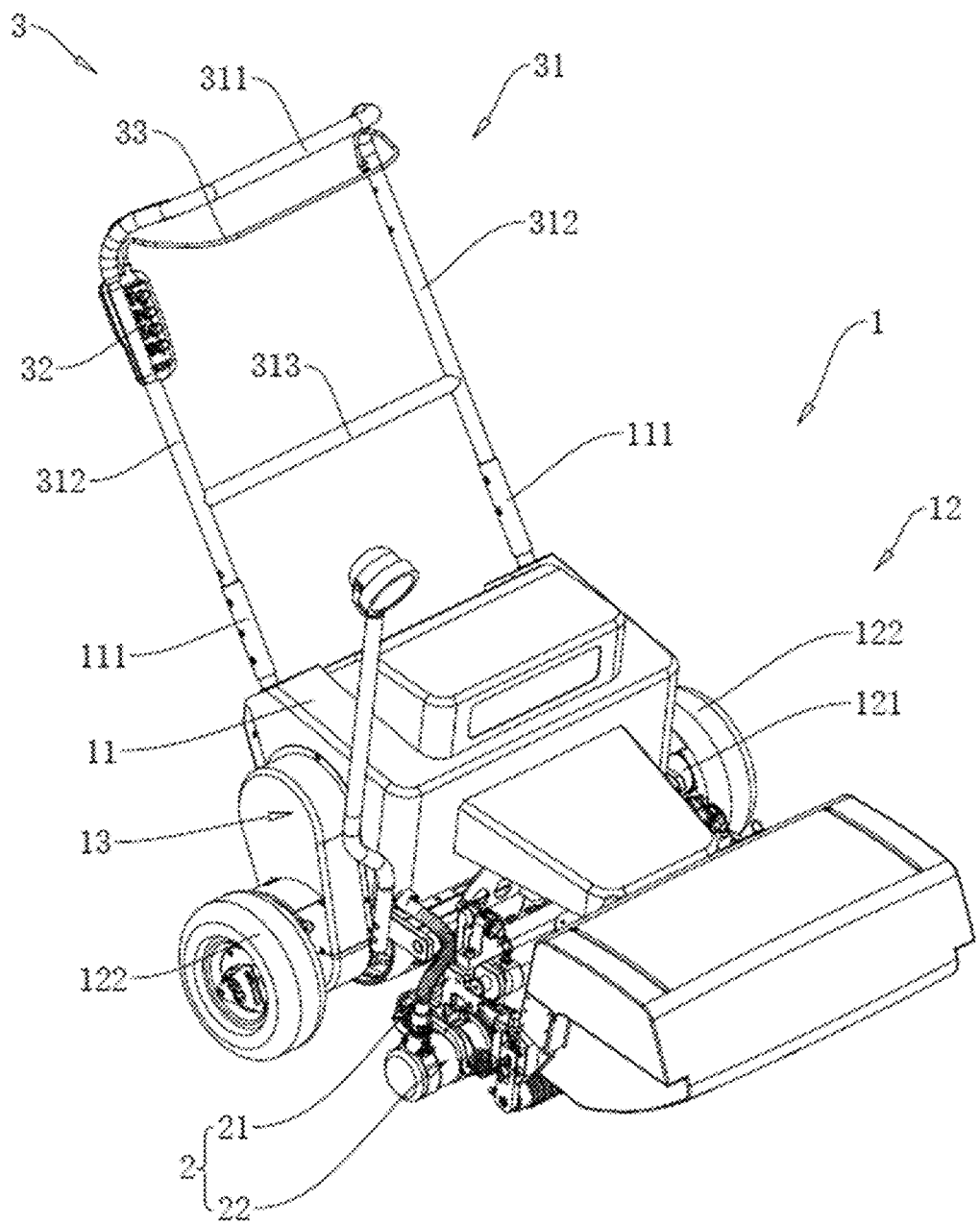
FIG. 1 is a schematic diagram of a lawnmower in Embodiment 1 of the present application.

The present embodiment discloses a lawnmower. Referring to FIG. 1, the lawnmower includes a power unit 1, a lawn mowing device 2 and a control device 3. The control device 3 is detachably connected to the power unit 1, and the lawn mowing device 2 is detachably connected to the power unit 1.

The power unit 1 includes a base 11, a wheel mechanism 12 and a drive mechanism 13. The wheel mechanism 12 includes a rotary shaft 121 and two wheels 122, the rotary shaft 121 penetrates through the base 11 and is rotatably connected to the base 11, and the rotary shaft 121 has two ends fixedly connected to the two wheels 122 respectively. The drive mechanism 13 is disposed on the base 11 and configured to drive the rotary shaft 121 to rotate and drive the lawnmower to move forward. The drive mechanism includes a traction motor and a transmission assembly. The traction motor is disposed on the base 11 and configured to drive the transmission assembly to operate and drive the lawnmower to move forward.

Figure 2:
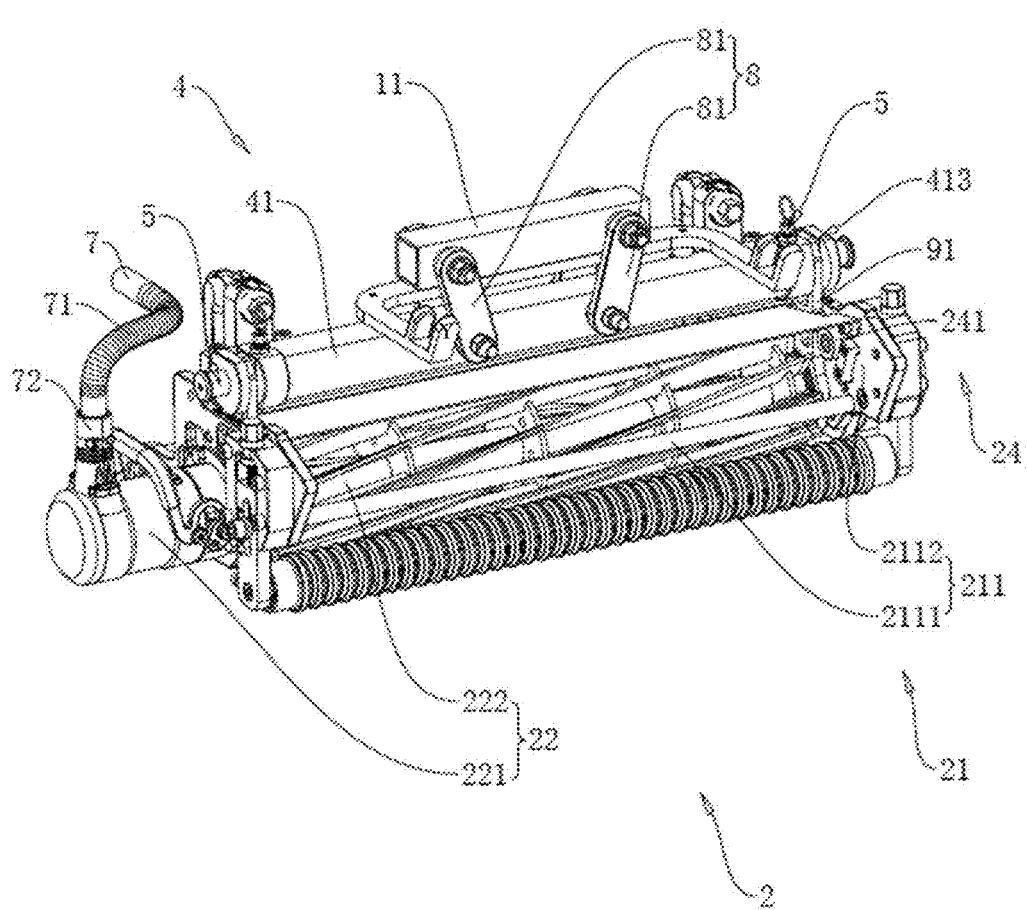
FIG. 2 is a schematic diagram of a blade holder, a buffer device and a first lawn mowing mechanism in Embodiment 1 of the present application.
Figure 3:
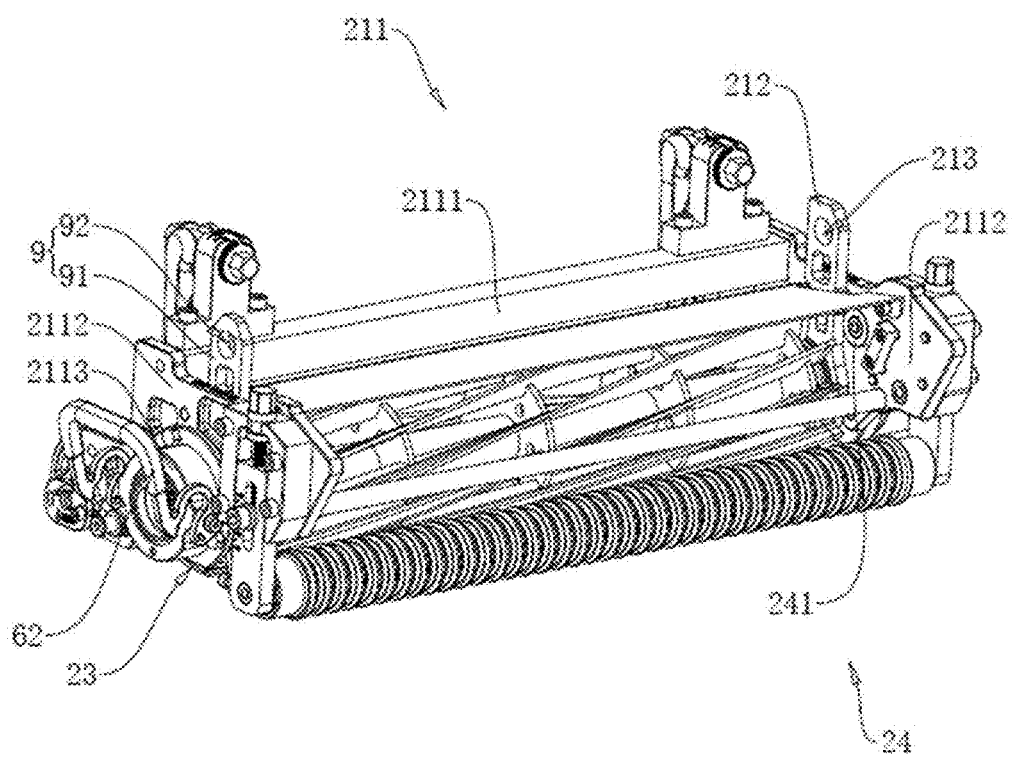
FIG. 3 is a schematic diagram of the blade holder and the first lawn mowing mechanism in Embodiment 1 of the present application.

Referring to FIG. 2 and FIG. 3, the lawn mowing device 2 includes a blade holder 21, a first lawn mowing mechanism 22 and a second lawn mowing mechanism 23. The blade holder 21 is detachably connected to the base 11, and each of the first lawn mowing mechanism 22 and the second lawn mowing mechanism 23 is disposed on the blade holder 21. The lawn mowing function can be realized under the cooperation of the first lawn mowing mechanism 22 and the second lawn mowing mechanism 23.

A second connection device 9 is provided between the first locking device 4 and the blade holder 21, and the blade holder 21 oscillates front-to-back through the second connection device 9. The second connection device 9 includes at least one connection block 91, and the blade holder 21 includes a top blade carrier 211. Two connection blocks are provided, and lower ends of the two connection blocks 91 are rotatably connected to the top blade carrier 211. The two connection blocks 91 are parallel to each other, and each connection block 91 is formed with a penetrating hole 92. A first installation rod 41 is configured with assembly grooves 413, and one side of each of the assembly grooves 413 is open. When the connection blocks 91 are mounted in the assembly grooves 413, and side walls of the connection blocks 91 abut against inner side walls of the assembly grooves 413, an axis of a first insertion hole 411 coincides with an axis of the penetrating hole 92, so that first pins 42 can be assembled and disassembled quickly.

Figure 5:
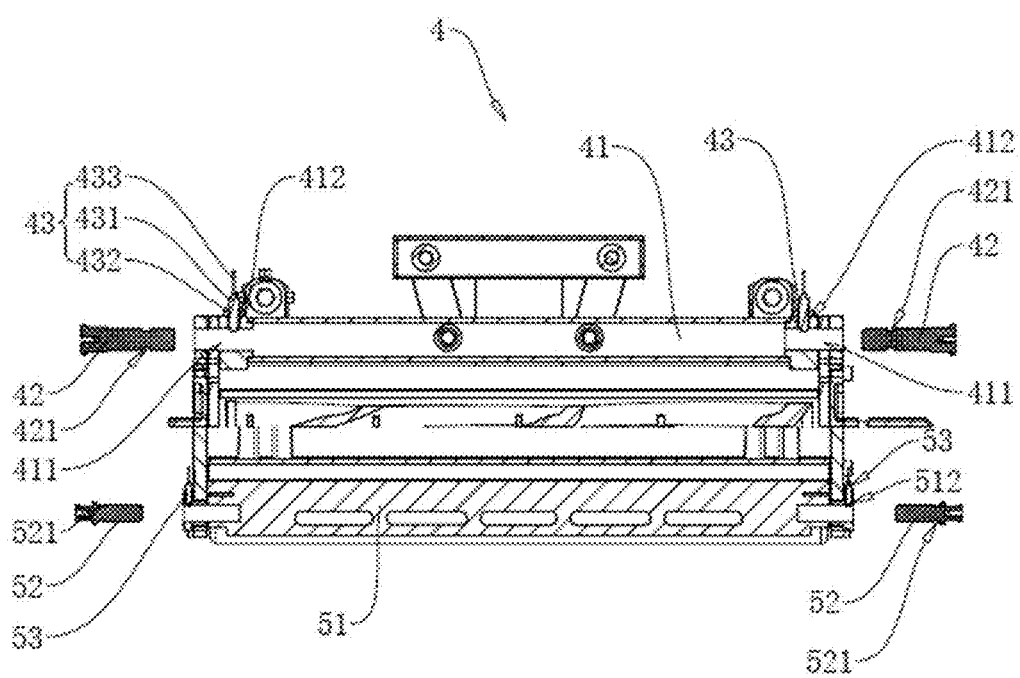
FIG. 5 is a sectional view of the first locking device and the second locking device along A-A direction in Embodiment 1 of the present application.
Figure 6:
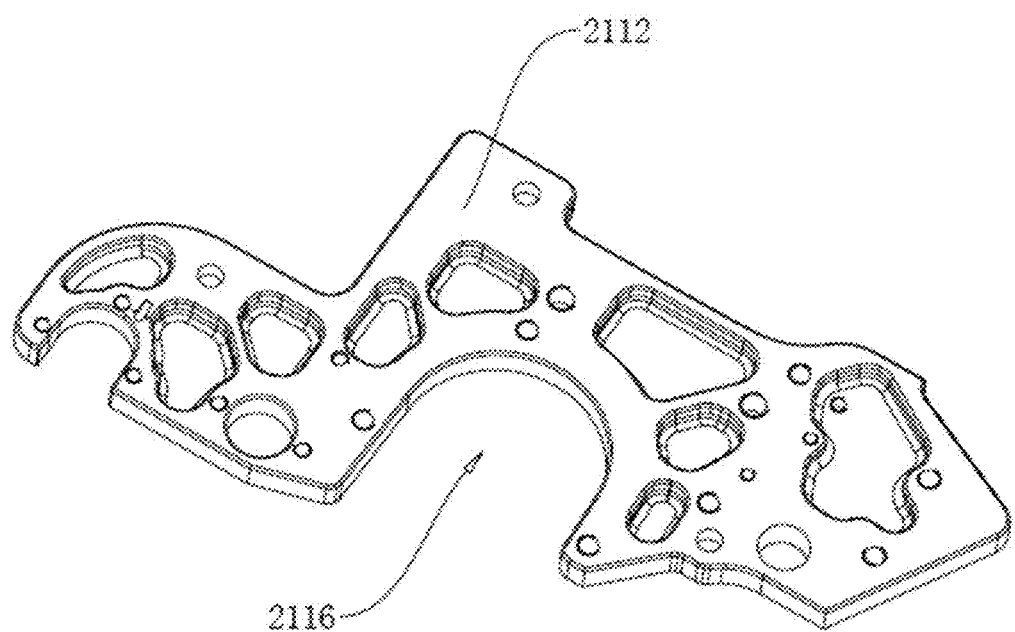
FIG. 6 is a schematic diagram of an end plate in Embodiment 1 of the present application.

Referring to FIG. 3, FIG. 5 and FIG. 6, the base 11 is provided with a first locking device 4 for fixing the blade holder 21 on the base 11. The first locking device 4 includes a first installation rod 41, first pins 42 and first locking mechanisms 43. The first installation rod 41 is secured on the base 11 and has two ends abutting against inner side walls of the two connection blocks 91 respectively. Each of the two ends of the first installation rod 41 is configured with a first insertion hole 411, and each of the connection blocks 91 is configured with through relief grooves 2116, an axis thereof coincides the axis of the first insertion hole 411. The first installation rod 41 is configured with two assembly grooves 413 for accurately positioning the connection blocks 91. The two assembly grooves 413 are spaced from each other and in one-to-one correspondence with the two connection blocks 91. Since one side of each of the assembly grooves 413 is open, when the connection block 91 is properly installed in the assembly grooves 413, the side wall of the connection block 91 closely abuts against the inner side walls of the assembly grooves 413, thereby ensuring the installation stability.

Referring to FIG. 5, two first pins 42 and two first locking mechanisms 43 are provided. Each first pin 42 sequentially penetrates through the relief groove 2116 and the first insertion hole 411, and an end of each first pin 42 abuts against an end of the relief groove 2116 to fix the blade holder 21 on the base 11.

Referring to FIGS. 3 and 6, the top blade carrier 211 includes at least one connection member 2111 and at least one end plate 2112. The number of the end plates 2112 is two, and two ends of the connection member 2111 are detachably connected to the two end plates 2112 respectively. One side of each end plate 2112 is configured with the relief groove 2116 through which the first lawn mowing mechanism 22 penetrates, and one side of the relief groove 2116 facing an edge of the end plate 2112 is open. Regardless of an assembly process or a disassembly process of the end plate 2112, only the end plate 2112 needs to be disassembled without disassembling other parts, which generally requires only about 5 minutes, thereby improving the disassembly efficiency.

Referring to FIG. 2 and FIG. 3, at least two limiting mechanisms 24 are provided on the top blade carrier 211, and each limiting mechanism 24 includes two limiting members 241 each secured to the end plate 2112 through a bolt. The two limiting members 241 are respectively located on two opposite sides of the connection block 91, to limit a rotation angle of the blade holder 21 to ensure that the rotation angle of the blade holder 21 around the first installation rod 41 is 0-30°. The connection block 91 is firmly secured on the first installation rod 41 through the first locking mechanism 43, and the two limiting members 241 on the blade holder 21 are respectively located on the two sides of the connection block 91, to limit the rotation angle of the blade holder 21 relative to the first installation rod 41 in a range of 0 to 30°, thereby ensuring the stability of the lawn mowing device 2 during operation. When the lawn mowing device 2 faces different slopes, the blade holder 21 can be finely adjusted within the limited rotation angle.

First connection devices 8 are disposed between the base 11 and the first locking device 4, and the first locking device 4 oscillates laterally through the first connection device 8. Each first connection device 8 includes two linkage rods 81. Each linkage rod 81 has one end rotatably connected to the base 11 and another end rotatably connected to the first installation rod 41. When mowing lawn, in the case that there is a height difference between cutting surfaces at two sides of the lawnmower, the lawn mowing operation may be more stable and efficient through the first connection device 8, and thus jounce feeling caused by uneven cutting surfaces may be reduced.

Figure 4:
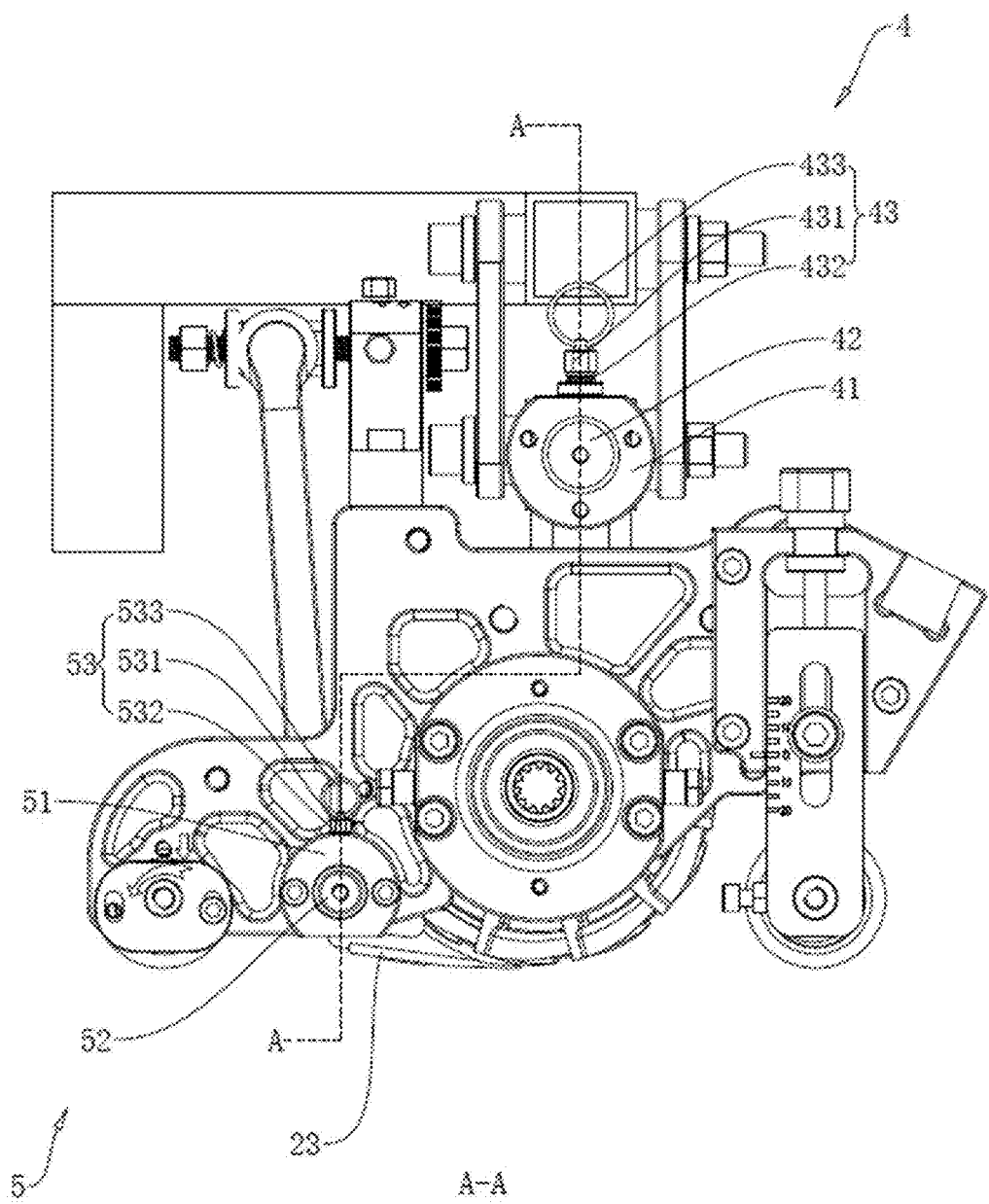
FIG. 4 is a schematic diagram of a first locking device and a second locking device in Embodiment 1 of the present application from another perspective.

Referring to FIG. 4 and FIG. 5, the top of the first installation rod 41 is configured with two first sliding-fit holes 412 in one-to-one correspondence with the first locking mechanisms 43. Each of the first locking mechanisms 43 includes a first locking rod 431 and a first elastic member 432. The first locking rod 431 penetrates through the first sliding-fit hole 412 and is in sliding fit with the first sliding-fit hole 412. A first elastic member 432 is sleeved on the first locking rod 431 and has one end fixedly connected to the first locking rod 431 and another end fixedly connected to the first installation rod 41. Specifically, the first elastic member 432 may be a spring. When no external force is applied to the first locking rod 431, one end of the first locking rod 431 facing the first pin 42 abuts against a surface of the first pin 42 by the elastic force of the first elastic member 432, so as to fix the first pin 42 within the first insertion hole 411 of the first installation rod 41, thereby fixing the lawn mowing device 2 on the base 11.

Each first locking mechanism 43 further includes a first gripping member 433 at an end of the first locking rod 431 away from the first installation rod 41. The first gripping member 433 is fixedly or movably connected to the first locking rod 431, so that the first locking rod 431 may be pulled by pulling the first gripping member 433, to remove the fastening effect of the first locking rod 431 on the lawn mowing device 2. In this way, the top blade carrier 211 can be manually disassembled and assembled by the operator without using tools, enabling quick disassembly and assembly to reduce operating time. The first gripping member 433 may be configured as a pull ring or a gripping hole, and the pull ring is fixedly or movably connected to the first locking rod 431.

Additionally, an arc-shaped outer side wall of the first pin 42 is configured with an annular first positioning groove 421 with a width equal to a diameter of the first pin 42. When no external force is applied to the first pin 42, an end of the first locking rod 431 is driven to abut against a groove bottom of the first positioning groove 421 by elastic force of the first elastic member 432. The first pin 42 may be prevented from axial movement through the first positioning groove 421, thereby enhancing stability of the blade holder 21 secured on the base 11.

Referring to FIG. 2, the first lawn mowing mechanism 22 includes a lawn mowing motor 221 mounted on the top blade carrier 211 and a reel blade 222 rotatably disposed on the top blade carrier 211, and the lawn mowing motor 221 is located at one end of the reel blade 222. The lawn mowing motor 221 has an output shaft fixedly connected to the end of the reel blade 222, and is configured to drive the reel blade 222 to rotate.

Figure 7:
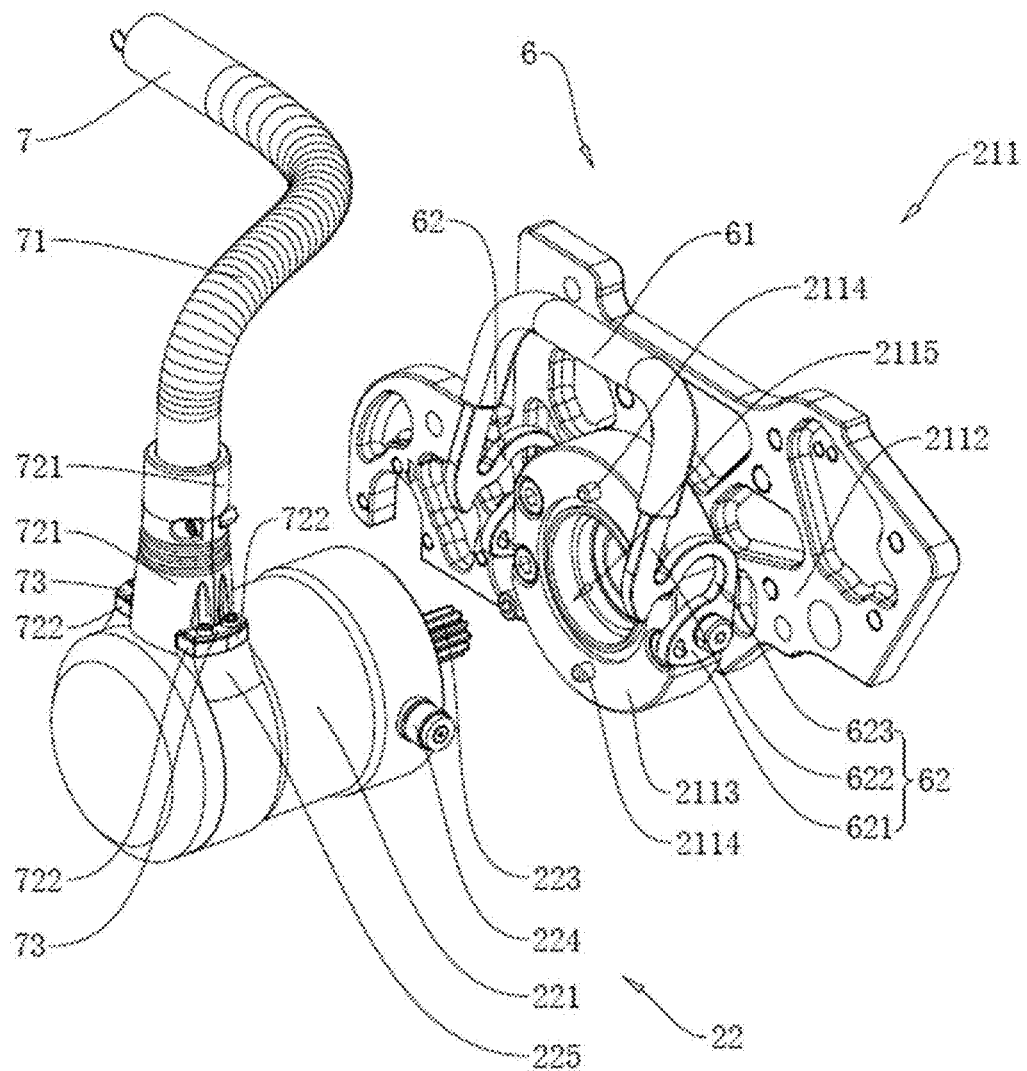
FIG. 7 is a schematic diagram of a lawn mowing motor and a rotary locking device in Embodiment 1 of the present application.

Referring to FIG. 2, FIG. 3 and FIG. 7, the lawn mowing motor 221 is detachably connected to the top blade carrier 211. The top blade carrier 211 is provided with a rotary locking device 6 for fixing the lawn mowing motor 221. The rotary locking device 6 includes a linkage member 61 and two rotary locking members 62 respectively located on two sides of the lawn mowing motor 221. One end of each rotary locking member 62 is rotatably connected to the blade holder 21, and two ends of the linkage member 61 are detachably connected to the two rotary locking members 62 respectively. Alternatively, the two ends of the linkage member 61 may also be integrated with the ends of the two rotary locking members 62.

Each rotary locking member 62 includes a locking seat 621 and an insertion rod 622. The locking seat 621 is rotatably connected to the blade holder 21, and an end of the insertion rod 622 close to the locking seat 621 is integrated with the locking seat 621. The linkage member 61 is U-shaped and has two ends each configured with an insertion hole. An end of the insertion rod 622 away from the locking seat 621 is inserted into the insertion hole. The insertion rod 622 is inserted into the insertion hole to fix the two locking seats 621 to the two ends of the linkage member 61, thereby improving the assembly and disassembly convenience of the rotary locking device 6.

Each locking seat 621 is configured with an arc-shaped locking groove 623 on one a side facing the lawn mowing motor 221. When the rotary locking member 62 is rotated to a vertical position, one end of the locking groove 623 facing the lawn mowing motor 221 is open, which facilitates subsequent locking operations. The lawn mowing motor 221 is provided with locking posts 223 on opposite sides. The locking posts 223 may be fixedly or rotatably connected with the lawn mowing motor 221. In the case that each of the two locking posts 223 is rotatably connected to the lawn mowing motor 221, friction between the locking posts 223 and the rotary locking member 62 may be reduced during fixing or disassembling of the lawn mowing motor 221, thereby ensuring a smoother operation. Additionally, after the lawn mowing motor 221 is secured by the rotary locking member 62, the rotary locking member 62 is uneasily to rotate due to the non-standard arc-shaped configuration of the locking groove 623. Therefore, it is ensured that the locking posts 223 cannot be separated from the locking groove 623, which improves the fastening effect of the rotary locking member 62 on the lawn mowing motor 221.

The top blade carrier 211 is fixedly provided with an annular seat 2113 on one side facing the lawn mowing motor 221. Two positioning posts 2114 are fixedly provided on the annular seat 2113, an end of the lawn mowing motor 221 is configured with two positioning holes correspondingly, and the positioning posts 2114 are in one-to-one correspondence with the positioning holes. When the lawn mowing motor 221 is installed on the top blade carrier 211, the positioning posts 2114 are inserted into the positioning holes. The two positioning posts 2114 are configured to position the lawn mowing motor 221, so as to install the lawn mowing motor 221 on the top blade carrier 211 more firmly.

The top blade carrier 211 is configured with a through hole 2115 on the side facing the lawn mowing motor 221. When the positioning posts 2114 on the top blade carrier 211 are inserted into the positioning holes at the end of the lawn mowing motor 221, the output shaft of the lawn mowing motor 221 is inserted into one end of the reel blade 222, so that the reel blade 222 may be set in rotation when the lawn mowing motor 221 drives the rotary shaft 121 to rotate.

Figure 8:
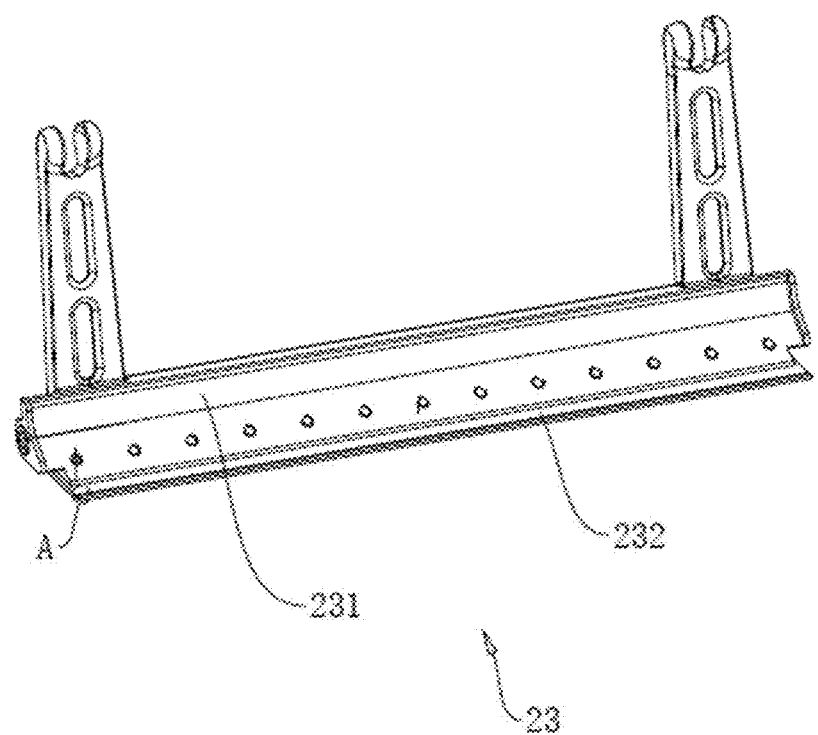
FIG. 8 is a schematic diagram of a second lawn mowing mechanism in Embodiment 1 of the present application.
Figure 9:
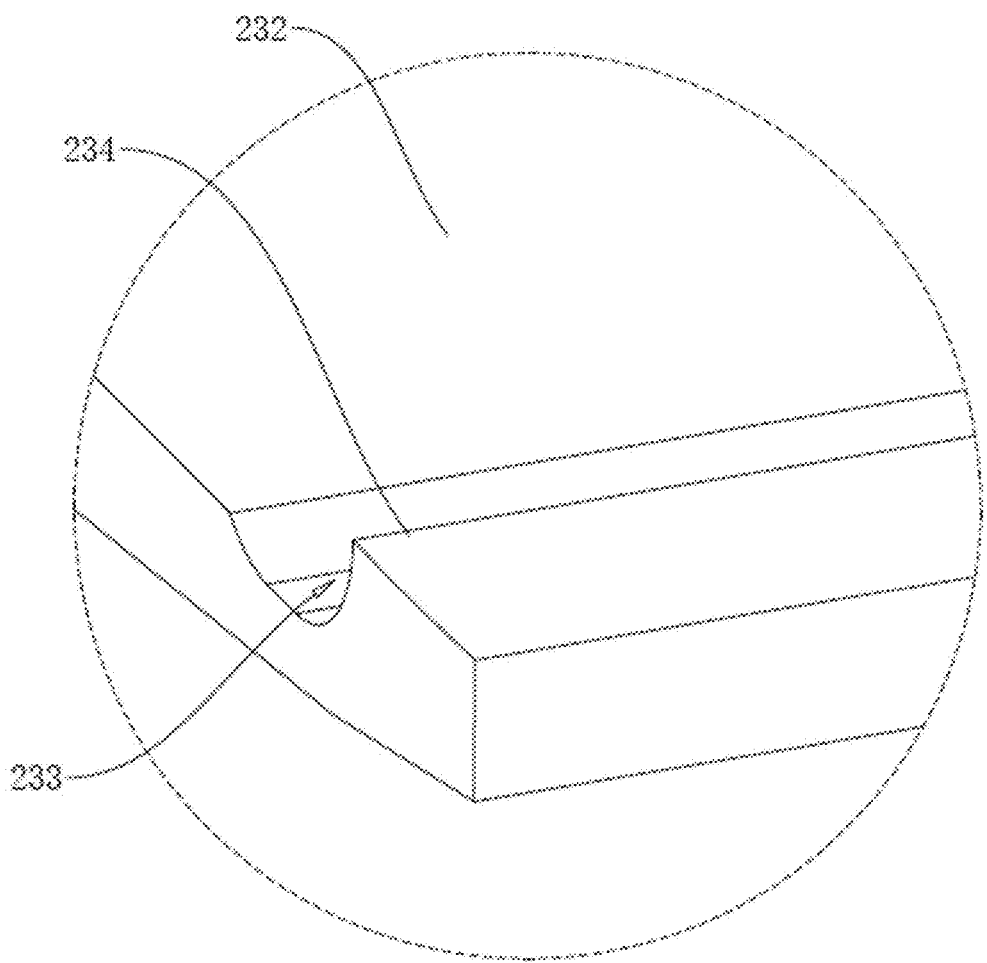
FIG. 9 is an enlarged view of part A in FIG. 8.

Referring to FIG. 3, FIG. 7 and FIG. 8, the second lawn mowing mechanism 23 is detachably connected to the top blade carrier 211, and the second lawn mowing mechanism 23 is located below the first lawn mowing mechanism 22. The second lawn mowing mechanism 23 includes a bottom blade carrier 231 and a bottom blade 232, the bottom blade carrier 231 is detachably connected to the top blade carrier 211, and the top blade carrier 211 is provided with a second locking device 5 for fixing the bottom blade carrier 231. When the bottom blade carrier 231 is secured on the top blade carrier 211, the bottom blade 232 is located right below the reel blade 222. When the lawnmower moves forward or reverse, the reel blade 222 may be driven to rotate by the lawn mowing motor 221. During the rotation of the reel blade 222, the reel blade 222 cooperates with the underlying bottom blade 232, thereby enabling the lawnmower to perform the mowing function efficiently.

An upper surface of the bottom blade 232 extends obliquely, and the bottom of the reel blade 222 abuts against the upper surface of the bottom blade 232. The upper surface of the bottom blade 232 is formed with a strip-shaped sharpening channel 233, and an inner side wall on one side of the strip-shaped sharpening channel 233 is provided with a sharpening ridge 234. When the lawn mowing motor 221 drives the reel blade 222 to rotate forwards, the reel blade 222 cooperates with the bottom blade to realize lawn mowing. When the lawn mowing motor 221 drives the reel blade 222 to rotate reversely, the bottom blade 232 is brought in contact with the reel blade 222, to realize an automatic sharpening function. The reel blade 222 may maintain its sharpness without disassembly and assembly, which greatly improves the efficiency and maintenance convenience.

Referring to FIG. 4 and FIG. 5, the second locking device 5 includes a second installation rod 51, a second pin 52 and a second locking mechanism 53. The second installation rod 51 is secured on the base 11 and have two ends abutting against inner side walls of the two connection blocks 91 respectively. Each of the two ends of the second installation rod 51 is configured with a second insertion hole 511. Each of the connection blocks 91 is configured with a penetrating hole. An axis of the second insertion hole 511 coincides with the axis of the penetrating hole. Two second pins 52 and two second locking mechanisms 53 are provided. Each second pin 52 penetrates through the penetrating hole and the second insertion hole 511 sequentially, and the end of each second pin 52 abuts against an end of the penetrating hole, thereby securing the blade holder 21 on the base 11.

Referring to FIG. 3, FIG. 4 and FIG. 5, a top of the second installation rod 51 is configured with two second sliding-fit holes 512, and the second locking mechanisms 53 are in one-to-one correspondence with the second sliding-fit holes 512. Each second locking mechanism 53 includes a second locking rod 531 and a second elastic member 532. The second locking rod 531 penetrates through the second sliding-fit hole 512 and is in sliding fit with the second sliding-fit hole 512. The second elastic member 532 is sleeved on the second locking rod 531 and has one end fixedly connected to the second locking rod 531 and another end fixedly connected to the second installation rod 51. Specifically, the second elastic member 532 may be configured as a spring. When no external force is applied to the second locking rod 531, one end of the second locking rod 531 facing the second pin 52 abuts against the surface of the second pin 52 by elastic force of the second elastic member 532, so as to secure the second pin 52 within the second insertion hole 511 of the second installation rod 51, thereby fixing the blade holder 21 on the base 11, and thus securing the lawn mowing device 2 on the base 11, which improve the convenience of assembly and disassembly of the lawn mowing device 2.

Each second locking mechanisms 53 further includes a second gripping member 533 disposed at an end of the second locking rod 531 away from the second installation rod 51. The second gripping member 533 is fixedly or movably connected to the second locking rod 531, so that the second locking rod 531 may be pulled by pulling the second gripping member 533, to release the fastening effect of the second locking rod 531 on the lawn mowing device 2, such that the operator may manually disassemble and assemble the top blade carrier 211 without a tool, thereby realizing a quick disassembly and assembly to save operating time. Specifically, the second gripping member 533 may be configured as a pull ring fixedly or movably connected to the second locking rod 531. Alternatively, the second gripping member 533 in this embodiment may also be a gripping hole on the second locking rod 531.

Referring to FIG. 5, an arc-shaped outer side wall of the second pin 52 is configured with an annular second positioning groove 521. When no external force is applied to the second pin 52, the end of the second locking rod 531 may be driven to abut against the groove bottom of the second positioning groove 521 by elastic force of the second elastic member 532, so as to limit the second pin 52, which prevents an axial displacement of the second pin 52, thereby fixing the blade holder 21 on the base 11 more firmly.

Referring to FIG. 7, a battery assembly is disposed on the base 11. A cable 7 is disposed between the battery assembly and the lawn mowing motor 221. An end of the cable 7 close to the battery assembly is fixedly connected to the battery assembly, and an end of the cable 7 close to the lawn mowing motor 221 is fixedly connected to the lawn mowing motor 221. The end of the cable 7 close to the lawn mowing motor 221 is externally covered with a flexible jacket 71, and one end of the flexible jacket 71 is connected to the lawn mowing motor 221. A hard jacket 72 is detachably connected to the lawn mowing motor 221, and the end of the flexible jacket 71 close to the lawn mowing motor 221 is located in the hard jacket 72. Due to the flexible jacket 71 and the hard jacket 72, the degree of bending of the cable 7 is reduced, thereby prolonging the service life of the cable 7.

The hard jacket 72 includes two symmetrical clamping sleeves 721 with the same structure. Inner side walls of the two clamping sleeves 721 abut against each other, and the two adjacent clamping sleeves 721 are secured by bolts and nuts. Bearing parts 224 are integrally formed on a top of a shell of the lawn mowing motor 221, and top surfaces of the two bearing parts 224 are flat. Each clamping sleeve 721 is integrally formed with a mounting part 722 on two opposite sides. The two mounting parts 722 have inner side walls abutting against each other and lower surfaces abutting against the top surfaces of the bearing parts 224. The top surfaces of the two mounting parts 722 on the same side are provided with clamping blocks 73, a lower surface of each clamping block 73 abuts against the top surfaces of the two mounting parts 722 simultaneously. Each clamping block 73 is penetrated by two bolts in one-to-one correspondence with the mounting parts 722. Each of the bolts penetrates through a respective one of the mounting parts 722 and is in threaded connection with a respective one of the bearing parts 224, which improves the convenience of assembly and disassembly of the hard jacket 72.

Referring to FIG. 1, the control device 3 includes a handrail 31. The base 11 is integrally formed with two mounting cylinders 111 parallel to each other on a side away from the lawn mowing device 2. Each of the mounting cylinders 111 is open on an end away from the base 11. The handrail 31 includes a holding rod 311 and two connection rods 312, and two ends of the holding rod 311 are fixedly connected to the two connection rods 312 respectively. The connection rods 312 are in one-to-one correspondence with the mounting cylinders 111, and the connection rods 312 are inserted into the mounting cylinders 111 to fix the handrail 31 on the base 11. The mounting cylinder 111 is sequentially configured with a plurality of through bolt holes along an axial direction, which facilitates the assembling and disassembling of the handrail 31, and allows the operator to adjust the height of the handrail 31 as required to adapt to different operation requirements and height differences. The handrail 31 further includes a reinforcing rod 313 having two ends fixedly connected to the two connection rods 312 respectively, thereby increasing overall structural strength of the handrail 31.

The control device 3 further includes a control unit 32 and a control rod 33. The control unit 32 is disposed on one of the connection rods 312, and the control unit 32 is electrically connected to the drive mechanism 13, so as to control an operation of the drive mechanism 13. Additionally, the control unit 32 is electrically connected to the lawn mowing motor 221 and configured for receiving an instruction from the operator and controlling the output shaft of the lawn mowing motor 221 to rotate forward or reversely, so as to perform mowing or blade sharpening.

To ensure operational safety, the control unit 32 is also equipped with the control rod 33 having one end rotatably connected to the control unit 32 and another end rotatably connected to the handrail 31. During operation, the operator needs to hold the control rod 33 and the handrail 31 at the same time, and press the control rod 33 in a direction to the handrail 31 until the two contact each other. At this time, the control unit 32 may receive a start signal, and then controls the power unit 1 to start, so that the lawnmower advances and executes the lawn mowing task. If the operator only holds the handrail 31 and does not press the control rod 33, the control unit 32 cannot receive the start signal, and the lawnmower will remain in a deactivated state, which effectively prevents safety risk caused by misoperation.

The control device 3 further includes a balance meter on the base 11 and electrically connected to the traction motor. When the inclination angle of the lawnmower is greater than 10° due to the operation during the advancing or turning process of the lawnmower, the balance meter can sense the inclination state of the base 11 in real time, and transmit a corresponding signal to the traction motor, so as to regulate and control and slow down the forward speed of the lawnmower automatically. The lawnmower achieves automatic coordination between mowing speed and forward speed through an integrated intelligent speed regulation and balance control system. During advancing or turning of the lawnmower, when the operator presses handrail 31 while pressing the control rod 33, the handrail 31 will drive the base 11 to rotate. When the inclination angle of the base 11 exceeds 10°, the balance meter can sense and transmit a signal to the traction motor promptly, so as to regulate and slow down the forward speed of the lawnmower, which improves the stability and safety of the lawnmower.

When the operator presses the control rod 33 and starts the lawnmower, the traction motor starts to work to drive the lawnmower to move forward. Meanwhile, the control unit 32 controls the output shaft of the lawn mowing motor 221 to rotate forward or reversely according to the instruction of the operator, so as to perform the lawn mowing or blade sharpening. When a rotation speed of the output shaft of the traction motor increases or decreases, a rotation speed of the output shaft of the lawn mowing motor correspondingly accelerates or slows down through the balance meter, so as to ensure that the mowing speed of the lawn mowing device 2 is synchronized with the forward speed of the overall lawnmower.

The implementation principle of the above embodiment is as follows. The first pin 42 penetrates through the penetrating hole 92 on the blade holder 21 and the insertion hole on the first installation rod 41, and the first locking rod 431 in the first locking mechanism 43 slides in the first sliding-fit hole 412 and clamps the first pin 42 by the elastic force of the first elastic member 432, so as to realize the stable connection between the blade holder 21 and the base 11. During disassembly, the user only needs to simply overcome the elastic force to move the first locking rod 431 to release the first pin 42, the lawn mowing device 2 can be quick disassembled without any tool, which simplifies the operation and improves the maintenance efficiency and convenience.

Embodiment 2

Figure 10:
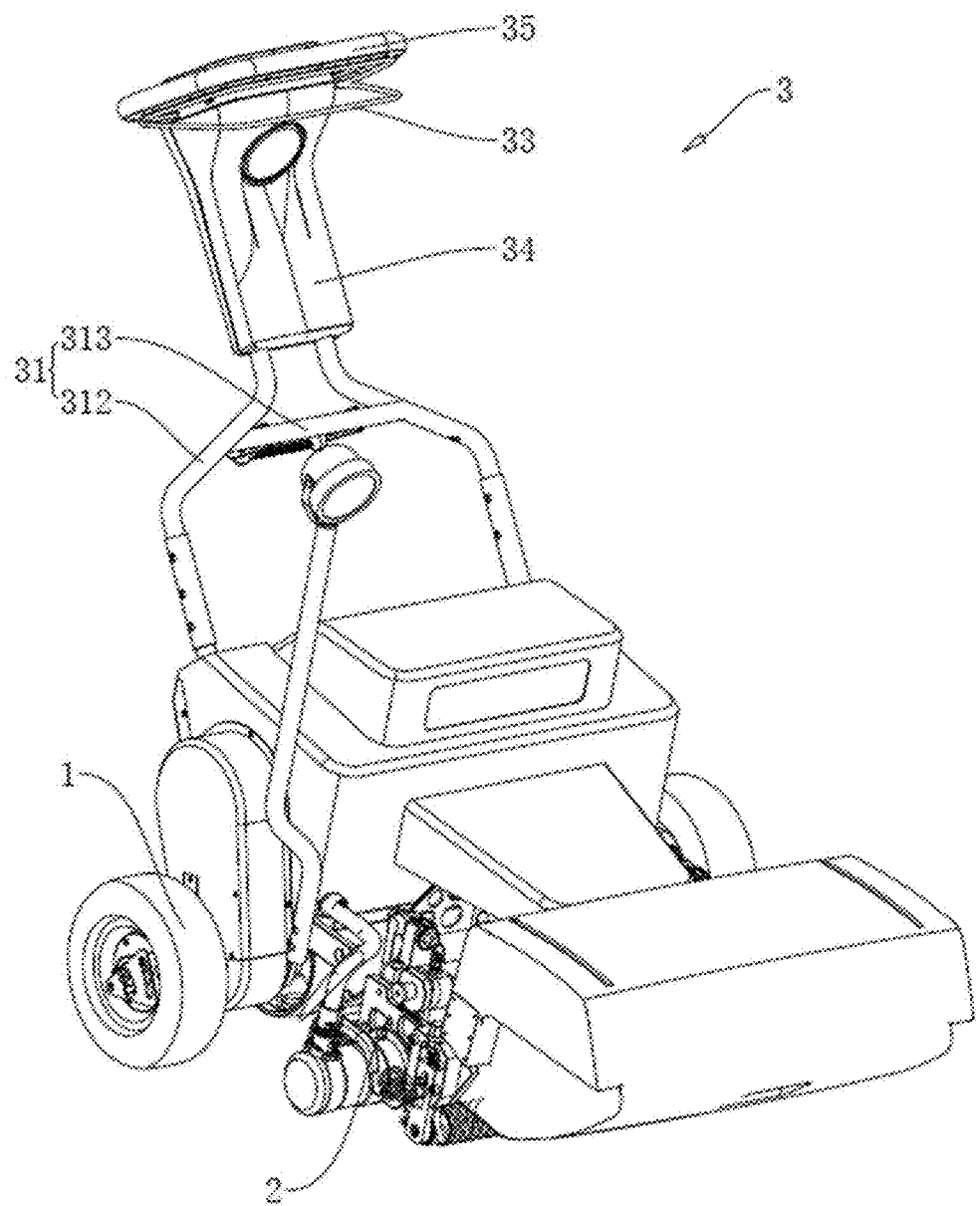
FIG. 10 is a schematic diagram of a lawnmower in Embodiment 2 of the present application.
Figure 11:
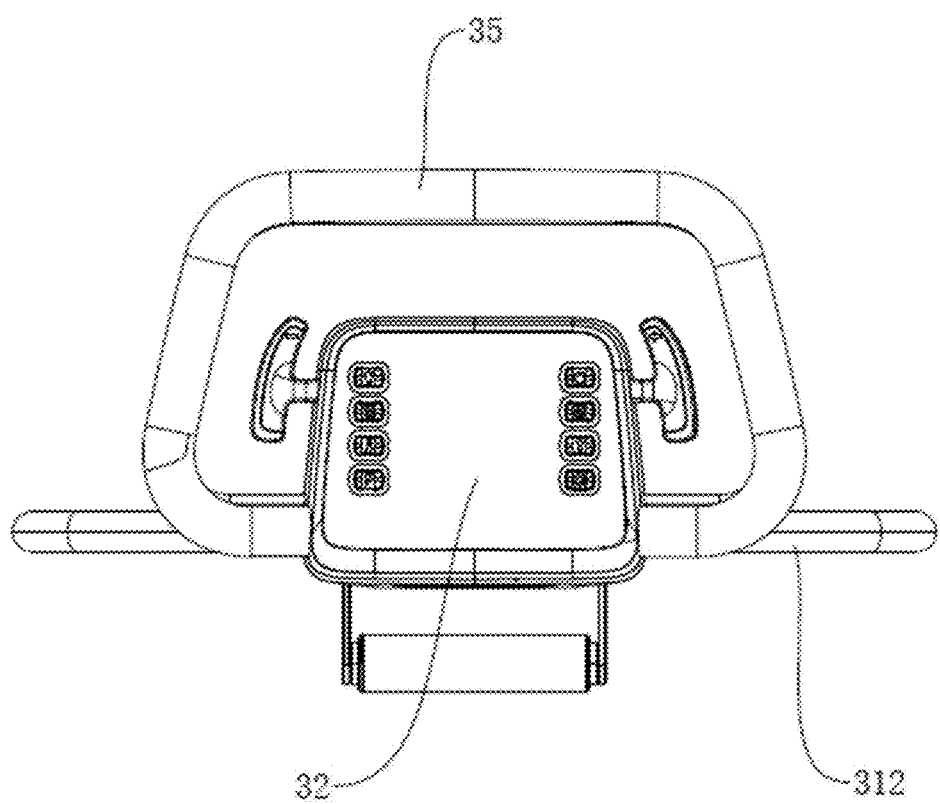
FIG. 11 is a schematic diagram of a control device in Embodiment 2 of the present application.

The difference between Embodiment 2 shown in FIGS. 10 and 11 and Embodiment 1 is that the handrail 31 is further provided with a mounting bracket 34 and a holding handle 35. Besides, the control device 3 in this embodiment still includes a handrail 31 including a reinforcing rod 313 and two connection rods 312. The reinforcing rod 313 has two ends fixedly connected to the two connection rods 312 respectively. The two connection rods 312 penetrate through the mounting bracket 34 and are fixedly connected to the mounting bracket 34. Such a configuration is more stable.

Referring to FIG. 2 and FIG. 10, the control unit 32 is disposed at an end of the mounting bracket 34, so that the control unit 32 may conveniently receive an instruction from the operator, and accurately control the lawn mowing motor 221 and the drive mechanism 13. Similar to Embodiment 1, the control unit 32 is also electrically connected to the drive mechanism 13 and the lawn mowing motor 221, and is configured for receiving the instruction from the operator, and controlling the output shaft of the lawn mowing motor 221 to rotate forward or reversely, so as to perform the lawn mowing or blade sharpening.

The control unit 32 in this embodiment is also provided with a control rod 33, and the two ends of the control rod 33 are rotatably connected to the mounting bracket 34 and electrically connected to the control unit 32. During operation, the operator needs to hold the control rod 33 and the handrail 31 at the same time, and press the control rod 33 in a direction to the handrail 31 until the control rod 33 and the handrail 31 contact each other. At this time, the control unit 32 may receive the start signal, and then control the power unit 1 to start, so that the lawnmower advances and performs the lawn mowing. If the operator only holds the handrail 31 and does not press the control rod 33, the control unit 32 cannot receive the start signal, and the lawnmower will remain in the deactivated state, which effectively prevents the safety risk caused by misoperation.

The above are all preferred embodiments of the present application and are not intended to limit a protection scope of the present application. Therefore, all equivalent changes made according to a structure, shape and principle of the present application shall fall within the protection scope of the present application.

LIST OF REFERENCE NUMERALS

1 power unit;
11 base;
111 mounting cylinder;
12 wheel mechanism;
121 rotary shaft;
122 wheel
13 drive mechanism
2 lawn mowing device
21 blade holder
211 top blade carrier
2111 connection member
2112 end plate
2113 annular seat
2114 positioning post
2115 through hole
2116 relief groove
22 first lawn mowing mechanism
221 lawn mowing motor
222 reel blade
223 locking post
224 bearing part
23 second lawn mowing mechanism
231 bottom blade carrier
232 bottom blade
233 sharpening channel
234 sharpening ridge
24 limiting mechanism;
241 limiting member
3 control device
31 handrail
311 holding rod
312 connection rod
313 reinforcing rod
32 control unit
33 control rod
34 mounting bracket
35 holding handle
4 first locking device
41 first installation rod
411 first insertion hole
412 first sliding-fit hole
413 assembly groove
42 first pin
421 first positioning groove
43 first locking mechanism
431 first locking rod
432 first elastic member
433 first gripping member
5 second locking device
51 second installation rod
511 second insertion hole
512 second sliding-fit hole
52 second pin
521 second positioning groove
53 second locking mechanism
531 second locking rod
532 second elastic member
533 second gripping member
6 rotary locking device
61 linkage member
62 rotary locking member
621 locking seat
622 insertion rod
623 locking groove
7 cable
71 flexible jacket
72 hard jacket
721 clamping sleeve
722 mounting part;
73 clamping block
8 first connection device
81 linkage rod
9 second connection device
91 connection block
92 penetrating hole

What is claimed is:

1. A lawnmower, comprising a power unit and a lawn mowing device, wherein the power unit comprises a base, the lawn mowing device comprises a blade holder detachably connected to the base, the base is provided with a first locking device for fixing the blade holder, the first locking device comprises a first installation rod on the base, first pins and first locking mechanisms disposed on the first installation rod for fixing the first pins, each end of the first installation rod is configured with a first insertion hole, the blade holder is configured with penetrating holes, each of the first pins penetrates through a respective one of the penetrating holes and the first insertion hole sequentially, each of the first locking mechanisms comprises a first locking rod and a first elastic member, the first installation rod is configured with first sliding-fit holes, an axial direction of the first sliding-fit holes is perpendicular to an axial direction of the first insertion hole, the first locking rod is inserted into and in sliding fit with a respective one of the first sliding-fit holes, the first elastic member is sleeved on the first locking rod and disposed in the respective one of the first sliding-fit holes, the first elastic member has a first end fixedly connected to the first locking rod and a second end fixedly connected to an inner side wall of the respective one of the first sliding-fit holes, and when no external force is applied to the first elastic member, an end of the first locking rod abuts against an outer side wall of a respective one of the first pins by an elastic force of the first elastic member.

2. The lawnmower according to claim 1, wherein the outer side wall of each of the first pins is configured with a first positioning groove, and when no external force is applied to a respective one of the first pins, the end of the first locking rod is driven to abut against a groove bottom of the first positioning groove by the elastic force of the first elastic member.

3. The lawnmower according to claim 1, wherein a first connection device is provided between the base and the first locking device, the first locking device oscillates laterally through the first connection device, the first connection device comprises at least two connection rods, and a first end of each of the at least two connection rods is rotatably connected to the base while a second end of each of the at least two connection rods is rotatably connected to the first installation rod.

4. The lawnmower according to claim 1, wherein a second connection device is provided between the first locking device and the blade holder, and the blade holder oscillates front-to-back through the second connection device.

5. The lawnmower according to claim 4, wherein the second connection device comprises two connection blocks, the blade holder comprises a top blade carrier rotatably connected to the two connection blocks, the penetrating holes are formed on the two connection blocks, the first installation rod is configured with two assembly grooves for positioning the two connection blocks, each of the two assembly grooves is open on one side, when the two connection blocks are mounted in the two assembly grooves respectively, a side wall of each of the two connection blocks abuts against an inner side wall of a respective one of the two assembly grooves, and an axis of the first insertion hole coincides with an axis of each of the penetrating holes.

6. The lawnmower according to claim 5, wherein the blade holder is provided with a limiting mechanism comprising two limiting members on the blade holder, the two limiting members are respectively located on two sides of each of the two connection blocks, and when the blade holder rotates, the side wall of each of the two connection blocks contacts an inner side wall of a respective one of the two limiting members, so as to limit a rotation angle of the blade holder by the two limiting members.

7. The lawnmower according to claim 5, wherein the top blade carrier comprises a connection member and at least one end plate, an end of the connection member is detachably connected to a respective one of the at least one end plate, one side of each of the at least one end plate is configured with a relief groove, and the relief groove is open toward an edge of a respective one of the at least one end plate.

8. The lawnmower according to claim 5, wherein the lawn mowing device further comprises a first lawn mowing mechanism, and the first lawn mowing mechanism comprises a lawn mowing motor detachably connected to the blade holder and a reel blade rotatably disposed on the blade holder.

9. The lawnmower according to claim 8, wherein the blade holder is provided with a rotary locking device comprising a linkage member and at least one rotary locking member, the linkage member is connected with the at least one rotary locking member, each of the at least one rotary locking member is configured with an arc-shaped locking groove, the lawn mowing motor is provided with at least one locking post, when the at least one rotary locking member rotates, each of the at least one locking post lies in a movement track of the arc-shaped locking groove on a respective one of the at least one rotary locking member, and when the at least one rotary locking member rotates to a position, each of the at least one locking post falls into a respective one of the at least one arc-shaped locking groove, so as to secure the lawn mowing motor on the blade holder.

10. The lawnmower according to claim 8, wherein the base is provided with a battery assembly connected to the lawn mowing motor through a cable, a flexible jacket is sleeved on the cable, a hard jacket is sleeved on the flexible jacket, the hard jacket is detachably connected to the lawn mowing motor, the hard jacket comprises two clamping sleeves, inner side walls of the two clamping sleeves abut against each other, the two clamping sleeves are secured through bolts and nuts, the lawn mowing motor is provided with a bearing part, each of the two clamping sleeves is fixedly provided with mounting parts, lower surfaces of the mounting parts abut against an upper surface of the bearing part, upper surfaces of two of the mounting parts on a same side each are provided with a clamping block, a lower surface of the clamping block abuts against the upper surfaces of the two of the mounting parts simultaneously, the clamping block penetrates through a bolt in correspondence with a respective one of the mounting parts, and the bolt penetrates through and is in threaded connection with the respective one of the mounting parts.

11. The lawnmower according to claim 8, wherein the lawn mowing device further comprises a second lawn mowing mechanism detachably connected to the blade holder and below the first lawn mowing mechanism, the second lawn mowing mechanism comprises a bottom blade carrier detachably connected to the blade holder and a bottom blade disposed on the bottom blade carrier, the bottom blade is located below the reel blade, an upper surface of the bottom blade extends obliquely, a bottom of the reel blade abuts against the upper surface of the bottom blade, the upper surface of the bottom blade is configured with a strip-shaped sharpening channel, and an inner side wall on one side of the strip-shaped sharpening channel is provided with a sharpening ridge.

12. The lawnmower according to claim 11, wherein the blade holder is further provided with a second locking device for fixing the bottom blade carrier, the second locking device comprises a second installation rod, second pins and second locking mechanisms, the second installation rod is secured on the base and has two ends abutting against inner side walls of the two connection blocks respectively, each of the two ends of the second installation rod is configured with a second insertion hole, each of the second pins penetrates through the first insertion hole and the second insertion hole sequentially, so as to fix the blade holder on the base, each of the second locking mechanisms comprises a second locking rod and a second elastic member, the second installation rod is configured with second sliding-fit holes, an axial direction of each of the second sliding-fit holes is perpendicular to an axial direction of the second insertion hole, the second locking rod is inserted into and in sliding fit with a respective one of the second sliding-fit holes, the second elastic member is sleeved on the second locking rod and is disposed in the respective one of the second sliding-fit holes, the second elastic member has a first end fixedly connected to the second locking rod and a second end fixedly connected to the second installation rod, and when no external force is applied to the second elastic member, the second locking rod abuts against a surface of a respective one of the second pins by an elastic force of the second elastic member.

13. The lawnmower according to claim 8, further comprising a control device comprising a handrail detachably connected to the base, a control unit disposed on the handrail and configured to receive an operation instruction and control operation of the power unit and the lawn mowing device of the lawnmower, and a control rod, wherein the control rod is rotatably connected to the handrail.

14. The lawnmower according to claim 13, wherein the power unit further comprises a wheel mechanism rotatably connected to the base and a drive mechanism configured to drive the wheel mechanism to rotate, the drive mechanism comprises a traction motor, the control device further comprises a balance meter electrically connected to the traction motor, when the lawnmower is inclined at an angle greater than 10° during an advancing or turning process of the lawnmower, the balance meter senses an inclined state of the lawnmower in real time, and transmits a signal to the traction motor, so as to regulate and slow down a forward speed of the lawnmower automatically, and when a rotation speed of an output shaft of the traction motor increases or decreases, a rotation speed of an output shaft of the lawn mowing motor correspondingly increases or decreases, so as to ensure that a mowing speed of the lawn mowing device is synchronized with the forward speed of the lawnmower.

15. A lawnmower, comprising a power unit and a lawn mowing device, wherein the power unit comprises a base, the lawn mowing device comprises a blade holder detachably connected to the base, the base is provided with a first locking device for fixing the blade holder, the first locking device comprises a first installation rod on the base, first pins and first locking mechanisms disposed on the first installation rod for fixing the first pins, each end of the first installation rod is configured with a first insertion hole, the blade holder is configured with penetrating holes, each of the first pins penetrates through a respective one of the penetrating holes and the first insertion hole sequentially, a second connection device is provided between the first locking device and the blade holder, the blade holder oscillates front-to-back through the second connection device, the second connection device comprises two connection blocks, the blade holder comprises a top blade carrier rotatably connected to the two connection blocks, the penetrating holes are formed on the two connection blocks, the first installation rod is configured with two assembly grooves for positioning the two connection blocks, each of the two assembly grooves is open on one side, when the two connection blocks are mounted in the two assembly grooves respectively, a side wall of each of the two connection blocks abuts against an inner side wall of a respective one of the two assembly grooves, and an axis of the first insertion hole coincides with an axis of each of the penetrating holes.

\* \* \* \* \*